3,274,268
METHOD OF MAKING α-CHLOROBIBENZYLS, STILBENES AND RELATED COMPOUNDS
Donald F. Hoeg, Mount Prospect, and Donald I. Lusk, Chicago, Ill., assignors to Borg-Warner Corporation, Chicago, Ill., a corporation of Illinois
No Drawing. Filed Oct. 11, 1963, Ser. No. 315,684
7 Claims. (Cl. 260—649)

This invention relates to a method of making α,β-substituted chloroethanes in which the substitutents may be selected from the group consisting of aromatic, substituted aromatic, vinyl, substituted vinyl, and vinylidenyl and more particularly to the method of making α-chlorobibenzyls, stilbenes and related compounds.

The α,β-substituted chloroethanes such as the α-chlorobibenzyls and other related halides have been found to be useful for a variety of uses, such as pesticides, bacteriostats, and other biologically active compounds. These compounds have also found utility as intermediates, for the manufacture of dyes, optical brightening agents, scintillators, etc. Although it has been possible to make some of these compounds prior to this invention, the method by which they were made often involved a series of long and complex steps which resulted in poor yields. Thus, the prior methods were quite uneconomical as well as impractical.

Broadly stated, the present invention provides an exceedingly simple one-step method of making both aromatic and aliphatic α,β-substituted chloroethanes. This method comprises the reacting of an α-substituted alkyl chloride, wherein the α-substituent is an aromatic or an α,β unsaturated group, with an organolithium compound, such as butyl lithium, in a solution of tetrahydrofuran at a low temperature.

By low temperature it is meant a temperature between about −100° C. and about 0° C.

The α-substituted alkyl chlorides are reacted with the organolithium compounds in a solution of tetrahydrofuran as follows:

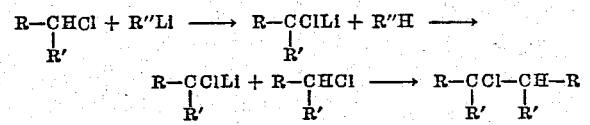

wherein R is selected from the group consisting of aromatic, substituted aromatic, vinyl, substituted vinyl, or vinylidenyl groups and R' is selected from the group consisting of hydrogen, and alkyl groups.

The α-substituted alkyl chlorides utilized in this invention are those having the general formula

wherein R is selected from the group consisting of aromatic, substituted aromatic, vinyl, substituted vinyl, or vinylidenyl groups, and R' is selected from the group consisting of hydrogen, and alkyl groups. The substituted aromatic groups may have groups such as hydrogen, methyl, halogen, and methoxy groups attached to their phenyl ring ortho, meta, or para with respect to the chloromethyl group.

Examples of aromatic α-substituted alkyl chlorides that may be reacted in accordance with the method of this invention, as indicated in the reaction above, are as follows: p,α-dichlorotoluene; o,α-dichlorotoluene; o-methylbenzyl chloride; p-methylbenzyl chloride; benzal chloride; benzhydryl chloride; p-methoxybenzyl chloride; 1-phenyl-1-chloroethane; 3-chloro-propenylbenzene, and the like.

As indicated in the reaction set forth above, these aromatic α-substituted alkyl chlorides react to form the α,β-substituted alkyl chlorides. Examples of the aliphatic substituted alkyl chlorides that may be reacted in accordance within the reaction set forth above are compounds such as 3-chloro-2-methylpropene; 3-chloro-2-ethyl propene; 3-chloro-2-propylpropene; 1-methyl-2-chloromethylethene; 1-ethyl-2-chloromethylethene; 1-propyl-2-chloromethylethene; and the like.

The organolithium compounds that may be utilized to react with the α-substituted alkyl chlorides in accordance with the method of this invention are the hydrocarbons of lithium generally represented by the formula RLi wherein R represents an alkyl hydrocarbon radical. Illustrative organolithium compounds are butyllithium, ethyllithium, isobutyllithium, and the like. The preferred organolithium compound is butyllithium.

The preferred solvent is tetrahydrofuran, however, other highly polar solvents may be equally operable.

The α-chlorobibenzyls made in accordance with the method of this invention may also be utilized as intermediates in the formulation of stilbenes and the dehydrochlorinated substituted aliphatics, i.e., such as trienes and other olefinic compounds. The synthesis of stilbenes from α-chlorobibenzyls is accomplished by dehydrochlorination of the α-chlorobibenzyls in accordance with the equation below.

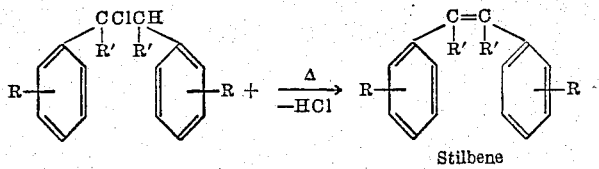
Stilbene

In the equation above R and R' are as hereinbefore defined for the α-substituted alkyl chlorides. As indicated, dehydrochlorination may be accomplished by gently heating the α-chlorobibenzyls until hydrogen chloride is evolved therefrom. Dehydrochlorination may also be readily accomplished by treatment of the α-chlorobibenzyl with strong bases, such as potassium tert. butoxide. The dehydrochlorination of the olefinic chloroalkyl intermediates prepared by coupling the unsaturated alkyl chlorides is best accomplished by treatment with a strong base. Similarly, the olefinic chloroalkyl intermediates prepared by coupling the unsaturated alkyl chlorides may also be dehydrochlorinated to produce the analogous olefinic compounds For a better understanding of the details of the present invention, reference is directed to the following examples.

EXAMPLE I (A) *Synthesis of α-chlorobibenzyl*

4.05 g. of benzyl chloride was added to 100 ml. of anhydrous tetrahydrofuran. All equipment had been previously dried and flushed with argon and all reactions were run in an argon atmosphere. The reaction was cooled to −90° C. with liquid nitrogen, and approximately 0.020 mole of butyllithium were slowly added in 40 ml. of hexane. The reaction was maintained at −90° C. for two hours. After two hours, the reaction mixture was poured into water to quench any active lithium compounds and the organic phase was separated from the aqueous phase. The aqueous phase was extracted with petroleum ether and the organic phases were combined. The organic phase was dried over sodium sulfate and stripped with vacuum. The residue of 4.04 grams was a faintly yellow liquid which analyzed 13.8% chloride by weight, which indicated a yield of 3.4 g. of

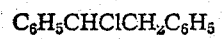

(B) *Synthesis of trans-stilbenes*

0.64 g. of this liquid was heated gently with a micro burner in a reflux system and gave off copious fumes of hydrogen chloride. On cooling the material solidified to platelike crystals, a chromatograph of this residue indicated 0.45 g. of trans-stilbene (M.P. 124° C.; calculated for $C_{14}H_{12}$: percent C., 93.4, (percent H, 6.67; found: C. 93.3, H. 6.68). The infrared and ultraviolet spectra of this material were identical to that of a control sample of trans-stilbene. The overall yield of stilbene was calculated as 2.72 g. or 94–95%.

EXAMPLE II

(A) *Synthesis of 1,2-di-(p-chlorophenyl)-1-chloroethane*

In the same manner as described in Example I, 6.42 g. (40.1 mmoles) of p,α-dichlorotoluene was dissolved in 100 ml. of tetrahydrofuran. To this was added 21 mmoles of butyllithium in 14 ml. of hexane at −100° C. The reaction solution became pale blue-green which gradually faded. After 1½ hours, the reaction was poured into water. The organic phase was isolated and vacuum stripped. 5.4 g., 95% yield of a crystalline white solid was obtained. This solid was recrystallized from petroleum ether-tetrahydrofuran. The solid melted at 81–82° C. (Theoretically calculated for $C_{14}H_{11}Cl_3$: C, 58.8; H, 3.85; Cl, 37.3. Found: C, 59.4; H, 3.95; Cl, 36.0%.) The infrared spectrum was consistent with 1,2-di-(p-chlorophenyl)-1-chloroethane.

(B) *Synthesis of 4,4'-dichlorostilbene*

0.54 g. of the 1,2-di-(p-chlorophenyl)-1-chloroethane was placed in a small distilling flask. On repeated heating with a micro burner, the compound lost 12.3% of its weight as copious fumes of HCl evolved. The solid residue in the entire distilling apparatus was recrystallized from petroleum ether=tetrahydrofuran to yield 0.47 g. (100% yield) transparent flat platelets of 4,4'-dichlorostilbene (M.P. uncorrected 179–179.5, lit. 175–176° C., calculated for $C_{14}H_{10}Cl_2$: C, 67.5; H, 4.05; Cl, 28.5. Found: C, 67.6; H, 4.07; Cl, 28.5). The infrared spectrum was consistent with 4,4'-dichlorostilbene.

EXAMPLE III

(A) *Synthesis of 1,2-di-(o-chlorophenyl)-1-chloroethane*

6.29 g. (39.3 mmoles) of o,α-dichlorotoluene was dissolved in 100 ml. of anhydrous tetrahydrofuran under an argon atmosphere. After cooling to −100° C., butyllithium (19.7 mmoles) was added slowly in 14 ml. of anhydrous hexane. The solution became a pale rose in color. After 1½ hours, the solution was pale orange. The solution was quenched in water and the product was isolated as in the previous examples. The product was a pale yellow liquid which contained 33.1% chlorine, or 91% of the theoretical amount of chlorine. From the infrared spectrum and the subsequent isolation of the 2,2'-dichlorostilbene (Example IV), it is apparent that this product is mainly 1,2-di-(o-chlorophenyl)-1-chloroethane.

(B) *Synthesis of 2,2-dichlorostilbene*

1.39 g. of the product of Example III(A) i.e. (1,2-di-(o-chlorophenyl)-1-chloroethane) was thermally dehydrochlorinated as described in the previous example. From this was obtained 1 g. of 2,2'-dichlorostilbene. After two recrystallizations from petroleum ether, white needles were obtained which melted at 98.5–99.0° C. (Calculated for $C_{14}H_{10}Cl_2$: C, 67.5; H, 4.05; Cl, 28.5. Found: C, 67.3; H, 4.02; Cl, 28.8.) The infrared spectrum was also consistent with the structure of 2,2'-dichlorostilbene.

EXAMPLE IV

(A) *Synthesis of 1,2-di-(p-methylphenyl)-1-chloroethane*

10.5 g. of α-chloro-p-xylene (4-methylbenzyl chloride) was dissolved in 100 ml. of anhydrous tetrahydrofuran in an argon atmosphere. The reaction was cooled to −100° C. and 37.3 mmoles of butyllithium in 25 ml. of hexane was added slowly. The solution became pale orange, which gradually faded. After three hours, the reaction was quenched in water and the product isolated as in previous examples. 8.4 g. of a clear, pale yellow liquid were obtained which on standing several hours, crystallized into white needles (M.P. 52–52.5° C.). Calculated for $C_{15}H_{17}Cl$: C, 78.5; H, 6.95; Cl, 14.5. Found: C, 78.8; H, 7.05; Cl, 14.5. The infrared spectrum was consistent with the structure of 1,2-di-(p-methylphenyl)-1-chloroethane.

(B) *Synthesis of 4,4'-dimethylstilbene*

1.09 g. of the product obtained in (A) was heated as described in earlier examples to effect dehydrochlorination. The solid residue was then recrystallized from tetrahydrofuran-petroleum ether to give a total of 0.80 g. of white platelets. (87% yield overall from p-methylbenzyl chloride.) (M.P., 186–186.5° C. uncorrected, lit. 180° C.; calculated for $C_{16}H_{16}$: C, 92.3; H, 7.69. Found: C, 92.0; H, 7.80.) The infrared spectrum was consistent with 4,4'-dimethylstilbene.

EXAMPLE V

(A) *Synthesis of 1,2-di-(o-methylphenyl)-1-chloroethane*

10.2 g. (73 mmoles) of o-methylbenzyl chloride was dissolved in 100 ml. of anhydrous tetrahydrofuran under an argon atmosphere. After cooling to −100° C., 36.8 mmoles of butyllithium was added in 24 ml. of hexane. The solution turned pale yellow-orange. After three hours, the reaction was quenched in water and the product isolated. 8.5 g. of a pale yellowish liquid was obtained which infrared analysis indicated it to be 1,2-di-(o-methylphenyl)-1-chloroethane.

(B) *Synthesis of 2,2'-dimethylstilbene*

1.28 g. of the product of (A) was heated, as described in previous examples, and copious fumes of HCl were evolved. The solid residue was recrystallized from petroleum ether to give 0.60 g. (55% overall yield) of 2,2'-dimethylstilbene crystals (M.P. after two recrystallizations, 78.5–80° C. uncorrected, calculated for $C_6H_{16}$: C, 92.3; H, 7.69. Found: C, 92.3; H, 7.92). The infrared spectrum was consistent with the 2,2'-dimethylstilbene structure.

EXAMPLE VI

*Synthesis of 2,5-dimethyl-3-chlorohexa-1,5-diene*

5.88 g. of 2-methyl-3-chloropropene (β-methallyl chloride) was dissolved in 100 ml. of tetrahydrofuran under an argon atmosphere and the solution was cooled to −100° C. 33 mmoles of butyllithium in 22 ml. of hexane was added slowly. No color was formed. After two hours, the reaction was quenched and the product isolated in the organic layer. The product was partially vacuum evaporated and then fractionally distilled to give 3.0 g. (~65% yield) of 2,3-dimethyl-3-chlorohexa-1,5-diene (B.P. 52° C. at 17 mm. Hg, lit. 35° C. at 5 mm., $n^D{}_{20}$ 1.4600, lit. 1.4612). The infrared spectrum was consistent with the compound underlined above.

While the invention has been described with particular reference to a preferred embodiment thereof, it will be understood by those skilled in the art that variations from the specific method set forth above may be made without departing from the invention in its broadest aspects.

We claim:

1. A method of making α,β-substituted chloroethanes of the formula

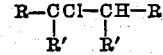

wherein R is selected from the group consisting of phenyl, substituted phenyl wherein the substituents are selected from the group consisting of methyl, halogen, and methoxy, vinyl and lower alkyl substituted vinyl groups and R' is selected from the group consisting of hydrogen and alkyl, said method comprising the step of reacting an α-substituted alkyl chloride of the formula

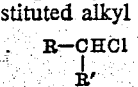

wherein R and R' of said α-substituted alkyl chloride is as defined for the α,β-substituted chloroethanes, with a lower alkyllithium compound in a solution of tetrahydrofuran at a temperature of between about $-100°$ C. and about $0°$ C.

2. The method of claim 1 wherein R is phenyl and R' is hydrogen.

3. The method of claim 1 wherein R is para-chlorophenyl and R' is hydrogen.

4. The method of claim 1 wherein R is ortho-chlorophenyl and R' is hydrogen.

5. The method of claim 1 wherein R is para-methylphenyl and R' is hydrogen.

6. The method of claim 1 wherein R is ortho-methylphenyl and R' is hydrogen.

7. The method of claim 1 wherein R is isopropenyl and R' is hydrogen.

References Cited by the Examiner

UNITED STATES PATENTS

| 1,180,497 | 3/1916 | Heinemann | 260—654 |
| 3,067,265 | 12/1962 | Frampton et al. | 260—654 |
| 3,090,819 | 5/1963 | Foster | 260—660 |

FOREIGN PATENTS 238,143  10/1945  Switzerland.

LEON ZITVER, *Primary Examiner.*

K. H. JOHNSON, K. V. ROCKEY, *Assistant Examiners.*